United States Patent [19]

Neathery et al.

[11] 4,341,362
[45] Jul. 27, 1982

[54] ANTICIPATING SERVO CONTROLLER FOR CONTROLLING MAGNETIC TAPE MOVEMENT IN A TAPE CASSETTE LOADER

[75] Inventors: David O. Neathery, St. Charles; Edward J. Riggs, West Chicago, both of Ill.

[73] Assignee: King Instrument Corporation, Westboro, Mass.

[21] Appl. No.: 199,923

[22] Filed: Oct. 23, 1980

[51] Int. Cl.³ .................... G11B 15/06; G11B 23/12
[52] U.S. Cl. .................................. 242/183; 242/56 R
[58] Field of Search .............. 242/182, 183, 184, 185, 242/186, 75, 75.3, 75.5, 56 R; 156/502–506; 226/7, 97, 195; 318/6, 7

[56] References Cited

U.S. PATENT DOCUMENTS

| | | | |
|---|---|---|---|
| 3,112,473 | 11/1963 | Wicklund et al. | 226/97 X |
| 3,648,134 | 3/1972 | Audeh et al. | 318/6 |
| 3,809,328 | 5/1974 | Cope et al. | 242/184 |
| 3,848,825 | 11/1974 | Zielke | 242/56 R |
| 3,940,080 | 2/1976 | Bennett | 242/182 |

Primary Examiner—Leonard D. Christian
Attorney, Agent, or Firm—Schiller & Pandiscio

[57] ABSTRACT

An electronic circuitry for regulating magnetic tape movement during loading of a predetermined length of tape paid out from a supply spool and wound into a tape cassette. The tension of the tape along its path of movement is controlled by a pair of vacuum column tension members providing a different tension at the supply spool than at the take up spool. A driving member interposes the two vacuum tension members for regulating tape movement between the same. Electronic circuitry drives the take-up spool of the cassette, the supply spool and the interposing driving member, formulating drive signals in response to the length of tape contained at the separate tension members and in anticipation of the need for tape in view of the instantaneous speed in which the tape is being pulled from a separate tension member.

13 Claims, 4 Drawing Figures

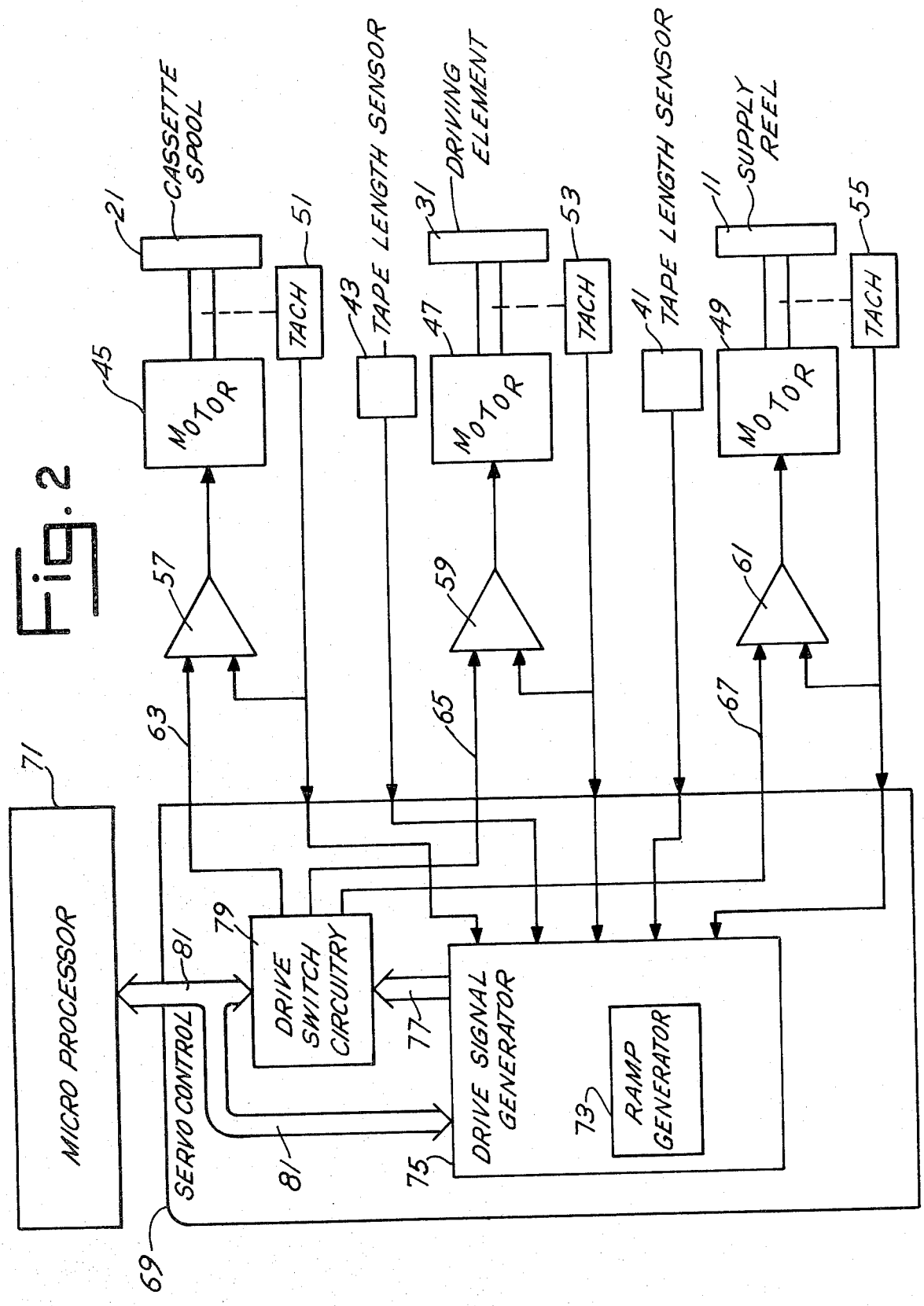

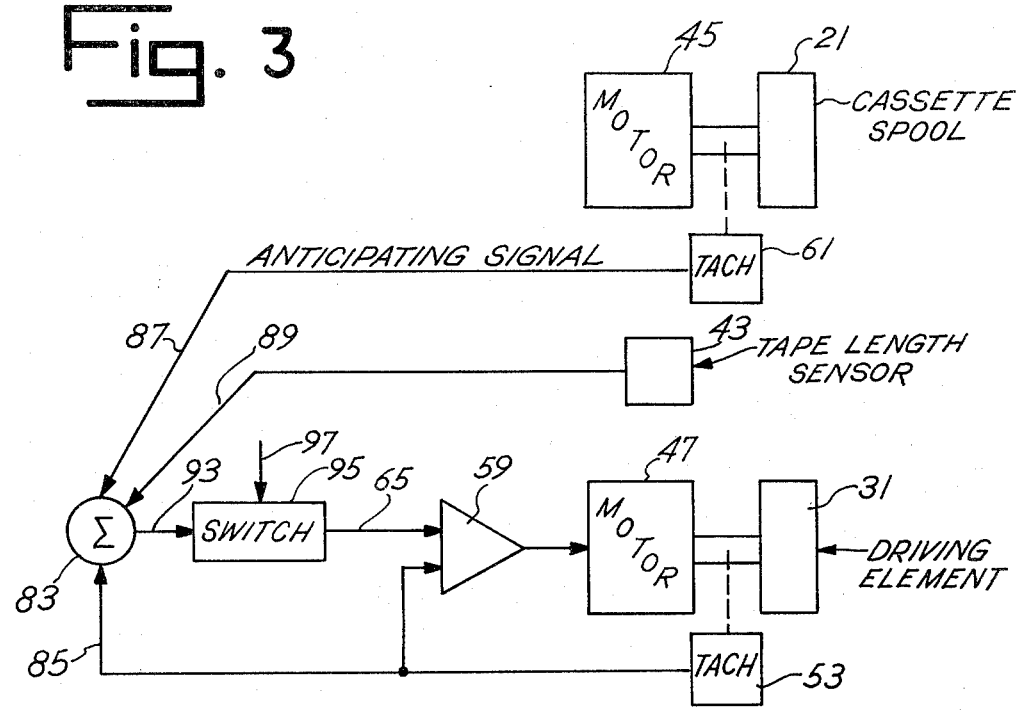
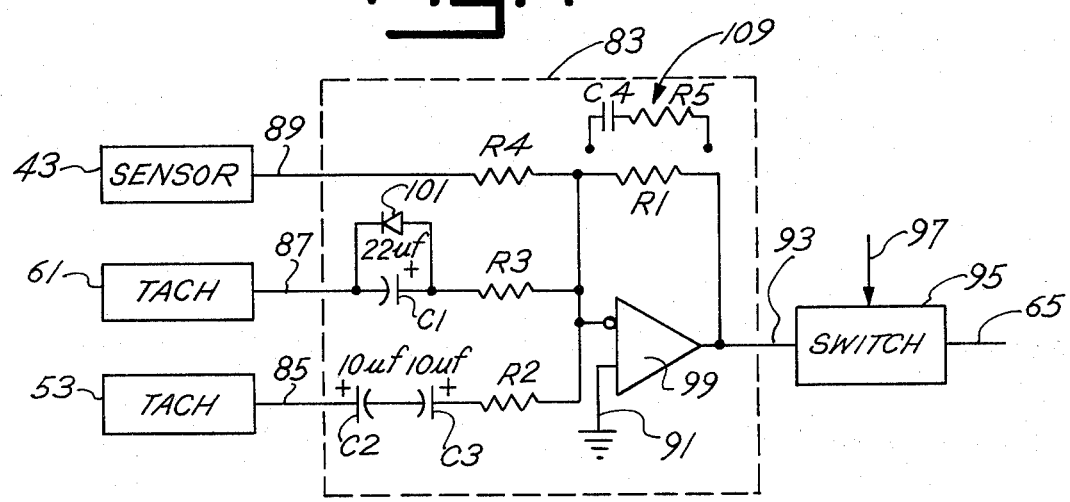

ANTICIPATING SERVO CONTROLLER FOR CONTROLLING MAGNETIC TAPE MOVEMENT IN A TAPE CASSETTE LOADER

BACKGROUND OF THE INVENTION

The invention relates to a tape movement control system for loading magnetic recording tape into tape cassettes at a high rate of speed, and more particularly relates to an electronic control circuitry for regulating the speed of the tape in order to permit vacuum column tension regulation of the tape during movement.

In a tape cassette loader, a predetermined length of tape is paid out from a spool and loaded within a tape cassette. Such cassette loaders include a single source of tension regulating the tension between the supply spool and the spool of the tape cassette. See for example, U.S. Pat. No. 3,753,834 issued to James L. King on Aug. 21, 1973.

In the art of tape cassette loading, the speed at which a cassette may be loaded with tape determines the quantity of cassettes produceable per machine in a given work day. To produce more cassettes, more machines would be necessary resulting in higher costs for machines, labor in operating the machines, maintenance and energy needs. It would be highly desirable to increase the speed at which the present state of the art machine can load tape into a single cassette.

However, as the cassette spool within the cassette is driven at extremely high rates of speed in order to wind tape extremely fast into the cassette, the tape bearing surfaces inside the cassette begin to heat up from frictional drag of the tape and of the spool of tape building up within the cassette, and the cassette begins to melt. In order to overcome this problem the tension on the tape is regulated by using a pair of vacuum tension regulators in which a very low tension level is applied to the tape portion being taken up into the cassette and a higher level of tension is applied to the tape portion being paid out from the supply spool. See U.S. Pat. Application, Ser. No. 199,924, filed on even date herewith, in the names of David O. Neathery and David W. Kincheloe which describes the dual vacuum column regulation in detail.

However, when driving such a dual vacuum column system at extremely high rates of speed, the tape loop within the vacuum column must be controlled at its high rate of movement. The instantaneous speed of the tape leaving the vacuum column may be so fast that the control of tape moving into the column may not respond quickly enough to prevent the tape loop from wholly leaving the vacuum column unless, of course, the vacuum column is unrealistically long.

Therefore, it is an object of the present invention to anticipate the need for tape within the vacuum column of the tension regulator and to feed tape into the column according to anticipated need during high speed movement of tape. This permits the length of the vacuum column to be smaller than would be neded if anticipated need were not provided.

SUMMARY OF THE INVENTION

These and other objects of the invention are achieved by controlling movement of the tape into a tension causing member in accordance with anticipated need for tape. Anticipated need is represented by an electrical signal generated in accordance with the quantity of tape being pulled from the tension member. The generated electrical signal is utilized to increase the feeding of tape into the column.

BRIEF DESCRIPTION OF THE DRAWINGS

FIG. 2 is an electrical schematic and block diagram of the preferred control circuitry embodiment utilized by the system of FIG. 1.

FIG. 3 is an electrical schematic and block diagram of a preferred anticipating controller included in the circuitry embodiment of FIG. 2.

FIG. 4 is an electrical schematic diagram of the anticipating controller embodiment of FIG. 3.

DESCRIPTION OF THE PREFERRED EMBODIMENT

Figure 1:
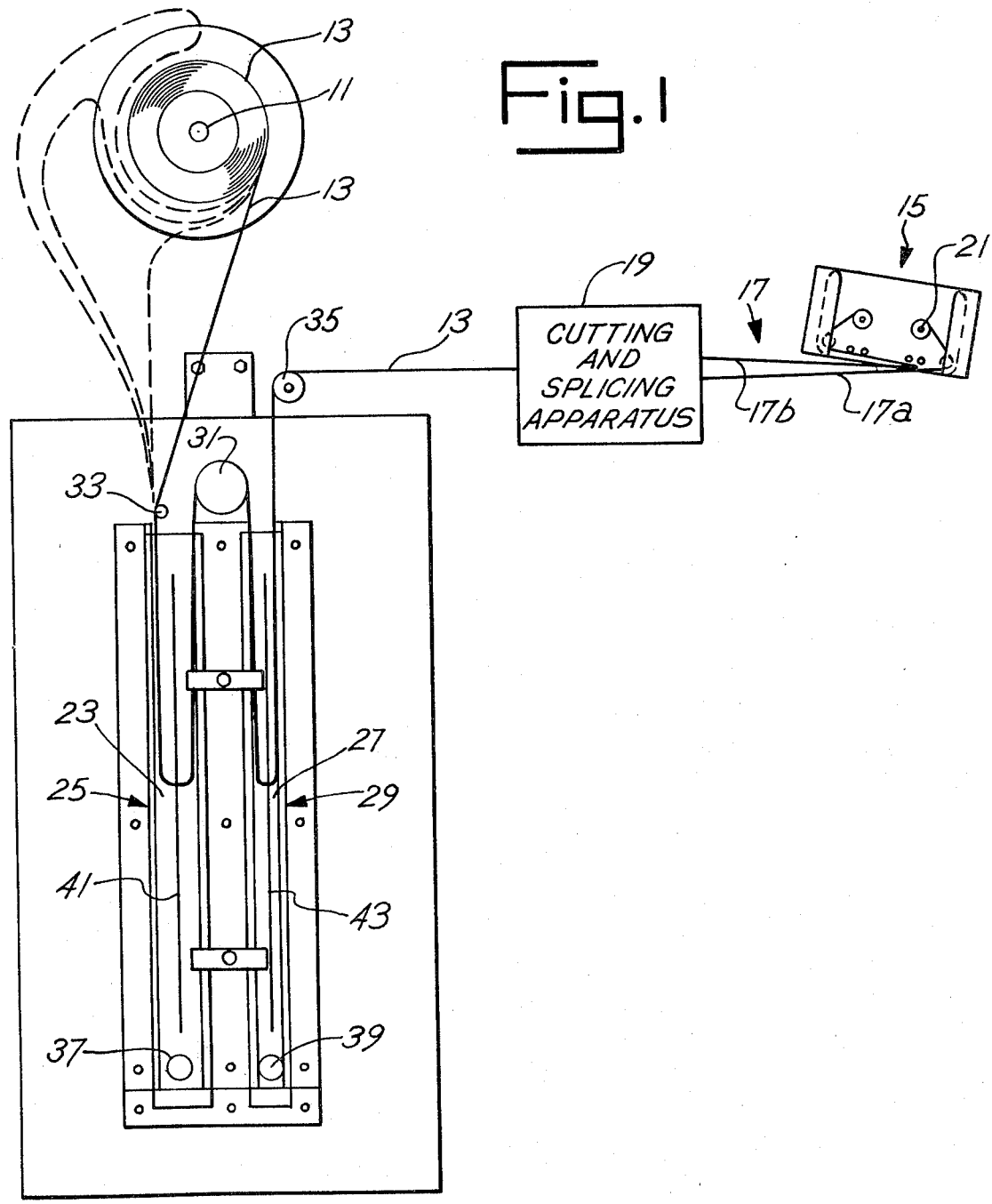
FIG. 1 is a front view showing a pair of vacuum column tension regulators of a tape control system utilizing a preferred embodiment of an electronic control circuit of the present invention.

Referring to FIG. 1, pertinent portions of a tape cassette loader are illustrated in describing a preferred embodiment of a tape driving control circuitry. A tape cassette loader is a machine well known in the art in which an empty cassette is loaded with a predetermined length of magnetic recording tape. such tape cassette loaders operate automatically by successive presentation of individual tape cassettes at a tape loading position and wherein the machine automatically loads a predetermined length of magnetic recording tape into the cassette, performing a cutting and splicing operation to load each cassette. Reference is made to U.S. Pat. Application Ser. No. 150,595, filed May 16,1980 in the names of David O. Neathery and David W. Kincheloe which provides background information as to the cutting and splicing operation utilized to load magnetic tape into a tape cassette.

A tape spool 11 of the cassette loader carries a supply of flexible magnetic recording tape 13 of which a predetermined length is to be cut, spliced and loaded into an empty tape cassette 15. The empty cassette will include a continuous, short length, tape leader 17 having a front portion 17a and a rear portion 17b, between which a length of magnetic tape 13 will be spliced. Cutting and splicing apparatus of the cassette loader, generally indicated by block 19, operates to pull the leader from the cassette in preparation for performing the cutting and splicing operation. The cutting and splicing apparatus is not illustrated in detail since such apparatus forms no part of the present invention.

Tape 13 is spliced to the front leader portion 17a and then wound onto one cassette spool 21 of cassette 15. The tape moves freely through cutting and splicing apparatus 19 during cassette loading until a predetermined length of tape is loaded into the cassette. The tape is then cut and spliced onto the rear leader portion 17b, and then wound into the cassette. Cassette 15 is then ejected and a next empty cassette is moved into position for loading.

Tape 13 is looped within a first vacuum column 23 of a tension regulator 25 and looped within a second vacuum column 27 of a tension regulator 29 prior to being loaded into cassette 15 from spool 11. A driving roller 31 moves the tape between the regulators and a pair of guide rollers 33, 35 are utilized along the tape path to direct the tape from supply spool 11 into and out of vacuum columns 23, 27. For a more specific description of the vacuum columns, reference is made to a copending application, Ser. No. 195,345 of David O. Neathery and David W. Kincheloe and filed on the same date as this application.

Regulators 25, 29 provide different levels of tension to the tape along its path of movement. Regulator 25 provides a first level of tension to the portion of the tape moving between roller 33 and spool 11 for permitting adequate payout of the tape from spool 11, and regulator 29 provides a different second level of tension to the portion of the tape moving between roller 35 and the cassette spool 21.

Vacuum enters columns 23, 27 via vacuum ports 37, 39 disposed at the bottom of the columns, for sucking tape 13 within the columns at predetermined tensions. As one end of tape 13 is pulled out of a column, the tape loop in the column will be pulled upwards out of the column since the tension remains constant on the tape. In order to prevent the tape from leaving the column, the other side of the tape is fed into the column in accordance with the extent of tape being pulled from the column. Thus, the amount of tape contained within the column or, in other terms, the position of the tape loop within the column is controlled.

In order to monitor the position of the tape loop within respective columns 23, 27, a pair of tape length sensors 41, 43 are utilized to monitor tape length. Each of the tape length sensors 41, 43 includes a slit running the substantial length of respective columns 23, 27 which are enclosed on the back side of the columns by a small encased housing (not shown) forming a small cavity. A pressure sensor (not shown) for each column is located at the back side of its respective housing for monitoring the pressure within the cavity of the housing. As the tape loop moves up and down within the vacuum column, the pressure monitored by the pressure sensor will vary in accordance with the length of the loop within the column. That is, atmospheric pressure will rest on the top of the tape loop and vacuum pressure will rest underneath the tape loop within the vacuum column and thus affect the pressure in the housing via the slits, in accordance with the position of the loop within the column. Similarly, photoelectric monitoring of tape length may be utilized, as will suggest itself to persons skilled in the art.

Referring to FIG. 3, the three driving elements are shown: cassette spool 21 for winding tape into cassette 15, driving element 31 for moving tape from vacuum column 23 to vacuum column 27, and supply reel 11 for paying out tape into vacuum column 23. The three elements 21, 31, 11 are driven by conventional servo motors 45, 47, 49, respectively. Each of the motors is connected to a conventional tachometer 51, 53, 55, each of which serves as a DC generator for producing a DC level signal indicative of the speed of its respective motor. Each DC signal is fed back to a conventional servo control amplifier 57, 59, 61 which drive a respective motor as shown. Each servo control amplifier 57, 59, 61 compares its respective tachometer signal with a respective driving input signal fed along respective conductors 63, 65, 67, for controlling the speed of its respective motor. The use of a servo control amplifier for controlling the driving speed of a motor in accordance with an input signal is well known within the art.

The driving input signals fed along conductors 63, 65, 67 are formulated by a servo control circuit 69 under command of a microprocessor 71. During winding of tape into cassette 15, the signal fed along conductor 63 is a ramp waveform signal generated by a conventional ramp generator 73, for ramping the cassette spool to a predetermined speed for winding tape into the cassette, and thereafter for ramping down the speed of cassette spool 21 toward a stopped position. As motor 45 takes up tape into cassette 15, the tape is pulled from column 27 and is monitored by its respective tape length sensor 43 (FIG. 2). Tape length sensor 43 generates an output signal which is utilized by a drive signal generator 75 which formulates a drive signal to be fed along conductor 65. As tape is pulled from column 27, the signal on line 65 is increased to command driving element 31 to pour more tape into column 27. The signal generated along conductor 65 is formulated by drive signal generator 75 as a function of the DC signal from tape length sensor 43.

Similarly, tape length sensor 41 generates a signal which is utilized by drive signal generator 75 to formulate the dirve signal generated along conductor 67. As tape is fed into vacuum column 27, and correspondingly pulled from vacuum column 23, the signal on line 67 must be increased for driving supply spool 11 to pour more tape into vacuum column 23. Thus, the signal generated along conductor 67 is formulated by drive signal generator 75 as a function of the DC signal from tape length sensor 41.

Drive signal generator 55 generates a plurality of driving signals along a bus 77 for selection by microprocessor 71 as inputs to the servo control amplifiers. A drive switch circuitry 79 receives the plurality of drive signals from bus 77 and is responsive to microprocessor control along a bus 81 for controlling the passage of the drive signals along conductors 63, 65, 67.

Drive switch circuitry 79 includes a pluralityof digitally operated analog switches each of which connects a conductor from bus 77 to one of conductors 63, 65, 67. The analog switches are digitally controlled according to logic signals placed on bus 81 by microprocessor 71. Microprocessor 71 also communicates with ramp generator 73 along bus 81 for causing a ramp up waveform to be generated by ramp generator 73 or a ramp down waveform to be generated by ramp generator 83.

Referring to FIG. 3, circuitry is illustrated which forms a part of drive signal generator 75, for generating the drive signal along conductor 65 during cassette loading. The drive signal if formulated by an analog computing circuit 83 which receives a tachometer signal from tachometer 53 along a conductor 85, a tachometer signal from tachometer 61 along a conductor 87 and a tape length signal from tape length sensor 43 along a conductor 89. Quantities derived from these three input signals are algebraically summed by analog computing circuit 83 for generating an output sum signal along a conductor 93.

The sum signal on conductor 93 is fed to signal conductor 65 via a digitally controlled analog switch 95 which forms a part of the drive switch circuitry 79 of FIG. 2. Switch 95 is controllably actuable by a logic signal placed along a conductor 97 by microprocessor 71. Thus, the microprocessor can control the placement of the sum signal onto conductor 65 by actuating switch 95.

The tachometer signal from tachometer 61 serves as an anticipating signal which provides to analog computing circuit 83 a signal indicative of the instantaneous speed of cassette spool 21. The use of the anticipating signal from tachometer 61 permits the driving element to respond to tape being pulled from vacuum column 27 more quickly than if only the tape length signal from sensor 43 is used. The anticipating signal from tachometer 61 tells analog computing circuit 83 to increase the voltage along conductor 65 in order to feed more tape into vacuum column 27 for anticipating the rise in speed of the cassette spool as indicated by tachometer 61. Thus, the demands of the cassette spool are anticipated by analog computing circuit 83 monitoring the speed of the cassette spool 21. The cassette spool is therefore able to accelerate very quickly without the tape loop being pulled out of vacuum column 27.

The signal fed along conductor 85 from tachometer 63 is utilized to tell analog computing circuit 83 the present velocity of driving element 31. This signal along conductor 85 is used by analog computing circuit 83 for system damping to prevent periodic oscillatory variations in the tape loop position within the vacuum column, as will be understood.

Referring to FIG. 4, analog computing circuit 83 is illustrated in greater detail and includes an operational amplifier (op amp) 99 connected for summing, inventing and scaling the three input signals appearing on conductors 85–89. A feedback resistor R1, connecting the output of op amp 99 to its inverting input, together with resistors R2, R3, R4, which respectively connect conductors 85, 87, 89 to the inverting input of op amp 99, serve to scale the signals appearing along the input conductors, as is understood. For example, the signal along conductor 89 will be R4/R1 of its value when output in the sum signal at 93; the higher frequency components of the signal appearing along conductor 87 will be R3/R1 of its value in the sum signal of conductor 93; and the higher frequency components of the signal appearing along conductor 85 will be R2/R1 of its value in the sum signal along conductor 93.

The values of R1-R4 are selected in conformance with the particular components used in the system. A preferred system was constructed with R1=300K; R2=4.7K; R3=10K; and R4=47K. Capacitors C1, C2 and C3 merely serve to roll off the lower frequency components of the signals appearing along conductors 85, 87 from tachometers 53, 61 respectively. A diode 101 may be utilized to protect capacitor C1 as is understood.

A circuit 109 formed of a series-connected resistor R5 and a capacitor C4 may be connected across resistor R1 for feeding back the output of op amp 99 to its inverting input. This effectively feeds back a derivitive of the output driving signal of conductor 93 to effectively lower the high frequency response of the analog computing circuit 83. This provides a response roll off feature to the circuit. Each of the signals appearing on conductors 85, 87, 89 may be impedance buffered by conventional circuitry prior to input to analog computing circuit 83, as will suggest itself.

What has been described is an electronic control circuitry for driving driving element 31 during a take up operation of magnetic tape in to the cassette. The cassette spool is driven at a high rate of speed according to a ramp signal for winding magnetic tape into the tape cassette. Driving element 31 is responsively controlled by the circuitry of FIG. 4 in order to attempt to maintain the tape loop within vacuum column 27 at, for example, its midpoint in the column.

Accordingly, circuitry similar to that disclosed in FIG. 4 may be utilized to control supply spool 11 in order to maintain the length of tape in vacuum column 23 at its approximate midpoint. An anticipation factor can be included in the control circuit of spool 11 in order to anticipate the need for tape in view of the instantaneous speed of driving element 31.

As will suggest itself, other values for resistors R1-R4 may be utilized to establish the proportionality of feedback control from tachometers 53, 55 and tape length sensor 41, for construction of the analog computing circuit which drives supply spool 11. For example, R1=82K; R2=6.8K; R3=47K; R4=47K; C1=47 micro f; C2=6.8 micro f; and C3=6.8 micro f.

In operation, microprocessor 71 generates commands along bus 81 (FIG. 2) for instructing ramp generator 73 to provide a ramp up output signal to a predetermined level. Microprocessor 71 closes the appropriate analog switch of drive switch circuitry 79 for passing the ramp generator signal along conductor 63 for ramping up the cassette spool to a predetermined spool speed. Microprocessor 71 activates the appropriate analog switches for passing signals onto conductors 65 and 67 for driving driving element 31 and supply spool 11 as a function of the changing lengths of tape in the vacuum columns as monitored by tape length sensors 43, 41 and as a function of the anticipated need for tape as indicated by tachometers 51, 53, respectively.

As will be understood, the present description relates to the specific circuitry embodiment of FIG. 4 which is utilized during high speed tape winding into cassette 15. As will suggest itself, the cassette loader may be operated in different modes which may or may not utilize the circuitry of FIG. 4. Either motor 45, 47, 49 may be driven by a predetermined signal with the remaining other two motors following according to signals developed as a function of the output signals of tape length sensors 41, 43.

For example driving element 31 provides an indication of the length of tape taken up into cassette 15. Thus, the number of rotations of driving element 31 may be counted in order to provide an indication of the length of tape loaded into cassette 15. Microprocessor 71 may monitor a counting circuit driven by driving element 31, for determining when a predetermined length of tape has been loaded into cassette 15. Because the tape is being loaded at an extremely high rate of speed, the microprocessor may monitor the count developed by driving element 31 for slowing the speed of cassette loading in order to accurately load a predetermined length of tape.

Once the microprocessor is aware that the predetermined length is being approached, the microprocessor may reactivate other analog switches of drive switch circuitry 79 for connecting a driving signal to driving element 31 for slowly moving the same until a predetermined tape count is reached. When element 31 is being independently driven, take up spool 21 and supply spool 11 may be driven by different signals formulated as a function of tape loop length in respective vacuum columns, as will suggest itself. Circuitry similar to that of FIG. 4 may be utilized, however, since drive element 31 will be driven at a low rate of speed, an anticipating signal should not be needed.

Thus drive signal generator 85 may include further analog computing circuitries similar to circuitry 83 of FIG. 3 which provide an output signal to an analog switch connectable to one of the driving leads 73, 75, 77.

It should be understood, of course, that the foregoing disclosure relates to preferred embodiments of the invention and that modifications or alterations may be made in such embodiments without departing from the spirit or scope of the invention as set forth in the appended claims.

We claim:

1. A method of loading magnetic tape from a supply spool onto a cassette spool of an empty tape cassette comprising the steps of:
   turning the cassette spool at an extremely high rate of speed, winding the magnetic tape into the cassette;
   providing a low first level of tension to the cassette side of the tape moving into the cassette;
   turning the supply spool at an extremely high rate of speed, paying out the magnetic tape from the supply spool;
   providing a second level of tension, higher than said first level of tension, to the supply side of the tape being paid out from the supply spool;
   anticipating the need of tape at said cassette side of the tape;
   regulating the flow of tape between said cassette side of the tape and said spool side of the tape, according to anticipated need of tape at said cassette side of the tape.

2. A method according to claim 1 wherein said step of providing a first level of tension includes vacuum sucking the tape within a first columnar space to provide said first level of tension; and wherein said step of providing a second level of tension includes vacuum sucking the tape within a second columnar space to provide said second level of tension.

3. A method according to claim 2 wherein said step of regulating includes moving the tape between said first and said second columnar space.

4. A method according to claim 3 wherein said step of moving includes controlling the rate of movement of the tape between said first and said second columnar space according to said anticipated need.

5. A method according to claim 4 and further including the step of monitoring the length of tape within said first columnar space.

6. A method according to claim 5 wherein said step of moving includes controlling the rate of movement of the tape between said first and said second columnar space according to the length of tape within said first columnar space.

7. A method according to claim 6 and further including the steps of: monitoring the length of tape within said first columnar space; and anticipating the need of tape at said second columnar space; and wherein said step of turning the supply spool includes controlling the rate of turning of the supply spool according to the length of tape within said first columnar space and according to the anticipated need of tape at said second columnar space.

8. A method according to claim 7 and further including the steps of: generating a ramp waveform signal; and controlling the turning of the cassette spool according to said ramp waveform signal.

9. A tape cassette loader in which two different controlled tensions are provided to a magnetic tape moving from a supply spool to a cassette spool of a tape cassette at a greatly varying rate of speed, comprising:
   a supply spool for providing a supply of magnetic tape;
   a cassette spool for receiving the magnetic tape;
   first tension means for receiving the magnetic tape from said supply spool and providing a first tension to said tape, said first tension means containing a length of the tape in order to maintain said first tension;
   first sensor means for monitoring the length of the tape contained by said first tension means;
   second tension means for receiving the tape from said first tension means prior to take up by said cassette spool and providing a second tension to the tape, said second tension means containing a length of the tape in order to maintain said second tension;
   second sensor means for monitoring the length of the tape contained by said second tension means
   tape moving means interposing said first and said second tension means for moving the tape from said first tension means to said second tension means;
   anticipator means for anticipating the need of tape by said second tension means; and
   control means for driving said tape moving means, said supply spool and said cassette spool, said control means responsive to said first and said second sensor means and said anticipator means for controlling the speed at which the tape is moved by said tape moving means and controlling the speed of said supply spool, whereby said first and said second tension are maintained during movement of the tape from said supply spool to said cassette spool.

10. A tape cassette loader according to claim 9 in which said first tension means includes a first vacuum column for applying said first tension to the tape; and wherein said second tension means includes a second vacuum column for applying said second tension to the tape.

11. A tape cassette loader according to claim 10 wherein said first sensor means effectively monitors the length of the loop of tape within said first vacuum column; and wherein said second sensor means effectively monitors the length of the loop of tape within said second vacuum column; and wherein said anticipator means effectively monitors the speed of said cassette spool.

12. A tape cassette loader according to claim 11 wherein said tape moving means includes a motor driven roller for moving tape from said first vacuum column to said second vacuum column.

13. A tape cassette loader according to claim 12 wherein said control means includes a ramp generator for generating a ramp waveform signal, said control means driving said cassette spool in accordance with said ramp waveform signal.

* * * * *